United States Patent
Weng et al.

(10) Patent No.: US 9,467,335 B2
(45) Date of Patent: Oct. 11, 2016

(54) METHOD, TERMINAL, AND SYSTEM FOR FIBER NETWORK MANAGEMENT

(71) Applicant: Huawei Technologies Co., Ltd., Shenzhen (CN)

(72) Inventors: Zhenbin Weng, Shenzhen (CN); Huaqing Liu, Shenzhen (CN); De Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 14/335,530

(22) Filed: Jul. 18, 2014

(65) Prior Publication Data

US 2014/0348508 A1     Nov. 27, 2014

Related U.S. Application Data

(63) Continuation of application No. PCT/CN2013/070204, filed on Jan. 8, 2013.

(30) Foreign Application Priority Data

Jan. 18, 2012    (CN) .......................... 2012 1 0016009

(51) Int. Cl.
    *H04L 12/24*      (2006.01)
    *H04J 14/02*      (2006.01)
    *H04Q 11/00*      (2006.01)
    *G02B 6/38*       (2006.01)

(52) U.S. Cl.
    CPC ......... *H04L 41/0806* (2013.01); *G02B 6/3895* (2013.01); *H04J 14/0254* (2013.01); *H04L 41/0853* (2013.01); *H04Q 11/0062* (2013.01); *H04L 41/0869* (2013.01)

(58) Field of Classification Search
None
See application file for complete search history.

(56) References Cited

U.S. PATENT DOCUMENTS

| | | | |
|---|---|---|---|
| 5,394,503 A | 2/1995 | Dietz, Jr. et al. | |
| 5,821,510 A | 10/1998 | Cohen et al. | |
| 8,396,059 B1 * | 3/2013 | Kreeger ................. | H04Q 11/00 370/386 |

(Continued)

FOREIGN PATENT DOCUMENTS

| CN | 1731709 A | 2/2006 |
|---|---|---|
| CN | 101982797 A | 3/2011 |

(Continued)

*Primary Examiner* — Jenee Williams
(74) *Attorney, Agent, or Firm* — Slater Matsil, LLP

(57) ABSTRACT

The present invention provides a method, terminal and system for fiber network management. A terminal obtains configuration information from a management system and sending an identifier of a configuration port connected to a fiber to an Optical Distribution Network (ODN) device to allow the ODN device to indicate, according to the configuration port identifier, a corresponding configuration port into which one end of the fiber is inserted. The method includes sending, according to a received first identifier of one end of the fiber and a corresponding configuration port identifier, which are sent by the ODN device, and a second identifier of an other end of the fiber, an identifier of a peer configuration port connected to the fiber to the ODN device to allow the ODN device to indicate, a corresponding peer configuration port into which the other end of the fiber is inserted.

18 Claims, 7 Drawing Sheets

(56) References Cited

U.S. PATENT DOCUMENTS

| | | | |
|---|---|---|---|
| 2002/0191602 A1* | 12/2002 | Woodring | H04L 29/12009 370/389 |
| 2003/0084219 A1* | 5/2003 | Yao | H04L 29/06 710/300 |
| 2003/0221001 A1* | 11/2003 | Moran | H04L 41/12 709/224 |
| 2004/0052471 A1 | 3/2004 | Colombo et al. | |
| 2004/0240807 A1 | 12/2004 | Frohlich et al. | |
| 2005/0233269 A1* | 10/2005 | Simpson | G03C 1/49818 430/619 |
| 2005/0238353 A1* | 10/2005 | McGlaughlin | H04L 49/357 398/45 |
| 2005/0286893 A1 | 12/2005 | Horiuchi et al. | |
| 2006/0029390 A1 | 2/2006 | Schmuck et al. | |
| 2010/0080237 A1* | 4/2010 | Dai | H04L 67/1097 370/400 |
| 2011/0081144 A1* | 4/2011 | Zhao | H04B 10/272 398/20 |
| 2011/0110664 A1 | 5/2011 | Zhao et al. | |

FOREIGN PATENT DOCUMENTS

| | | |
|---|---|---|
| CN | 102571201 A | 7/2012 |
| EP | 2306421 A1 | 4/2011 |

* cited by examiner

METHOD, TERMINAL, AND SYSTEM FOR FIBER NETWORK MANAGEMENT

This application is a continuation of International Application No. PCT/CN2013/070204, filed on Jan. 8, 2013, which claims priority to Chinese Patent Application No. 201210016009.2, filed on Jan. 18, 2012, both of which are hereby incorporated by reference in their entireties.

TECHNICAL FIELD

The present invention relates to the field of fiber communications and, in particular embodiments, to a method, a terminal, and a system for fiber network management.

BACKGROUND

With development of a fiber network technology, fiber to the neighborhood, fiber to the building, fiber to the home have already been applied. The number of fiber patch cords increasingly grows. A conventional ODN (optical distribution network) adopts a passive solution and attaches indicating labels to ports of both ends of a fiber patch cord to indicate a configuration port into which the fiber needs to be inserted. An operator connects a fiber patch cord or maintains a fiber connection according to the indicating labels.

During a management process of implementing the foregoing fiber connection or maintenance, the inventors find at least the following problems in the prior art. The foregoing fiber management method uses a manual operation, which easily causes a human error and inconvenience for management. In addition, automated line patrol and maintenance may not be performed.

SUMMARY

Embodiments of the present invention provide a method, a terminal, and a system for fiber network management, which can intelligently perform fiber management, with a low error rate and convenient management.

To achieve the foregoing objective, the embodiments of the present invention adopt the following technical solutions.

A fiber network management method is provided. The fiber network management method includes: obtaining configuration information from a management system, where the configuration information records an identifier of a configuration port connected to a fiber and an identifier of a peer configuration port connected to the fiber; sending the identifier of the configuration port connected to the fiber to an optical distribution network ODN device so that the ODN device to indicate, according to the received configuration port identifier, a corresponding configuration port into which one end of the fiber is inserted; receiving a first identifier of one end of the fiber and a corresponding configuration port identifier, which are sent by the ODN device, where the first identifier of one end of the fiber and the corresponding configuration port identifier are detected and sent by the ODN device after one end of the fiber is inserted into the corresponding configuration port; receiving a second identifier of the other end of the fiber, where the second identifier of the other end of the fiber is sent back after a fiber detecting module detects the other end of the fiber; where a first identifier and a second identifier of each fiber are one-to-one mapping; and sending, according to the received second identifier of the other end of the fiber, the first identifier of one end of the fiber, and the configuration information, the identifier of the peer configuration port connected to the fiber to the ODN device to allow the ODN device to indicate, according to the received identifier of the peer configuration port, a corresponding peer configuration port into which the other end of the fiber is inserted.

A terminal is provided. The terminal includes: an information obtaining unit, configured to obtain configuration information from a management system, where the configuration information records an identifier of a configuration port connected to a fiber and an identifier of a peer configuration port connected to the fiber; a first sending unit, configured to send the identifier of the configuration port connected to the fiber to an ODN device to allow the ODN device to indicate, according to the received configuration port identifier, a corresponding configuration port into which one end of the fiber is inserted; a first receiving unit, configured to receive a first identifier of one end of the fiber and a corresponding configuration port identifier, which are sent by the ODN device, where the first identifier of one end of the fiber and the corresponding configuration port identifier are detected and sent by the ODN device after one end of the fiber is inserted into the corresponding configuration port; a second receiving unit, configured to receive a second identifier of the other end of the fiber, where the second identifier of the other end of the fiber is sent back after a fiber detecting module detects the other end of the fiber; where a first identifier of each fiber and a second identifier of each fiber are one-to-one mapping; and a second sending unit, configured to send, according to the received second identifier of the other end of the fiber, the first identifier of one end of the fiber, and the configuration information, the identifier of the peer configuration port connected to the fiber to the ODN device to allow the ODN device to indicate, according to the received identifier of the peer configuration port, a corresponding peer configuration port into which the other end of the fiber is inserted.

A fiber network management system is provided. The fiber network management system includes an ODN device and a detecting module. The ODN device is configured to obtain a configuration port identifier and indicate, according to the configuration port identifier, a corresponding configuration port into which one end of a fiber is inserted, and detect, after one end of the fiber is inserted into the corresponding configuration port, a first identifier of one end of the fiber and a corresponding configuration port identifier; where the configuration port identifier is obtained from configuration information delivered by the management system. The detecting module is configured to detect a second identifier of the other end of the fiber, where a first identifier and a second identifier of each fiber are one-to-one mapping. The ODN device is further configured to obtain a peer configuration port identifier and indicate, according to the peer configuration port identifier, a corresponding peer configuration port into which the other end of the fiber is inserted; where the peer configuration port identifier is obtained according to the second identifier, the first identifier of one end of the fiber, and the configuration information.

The embodiments of the present invention provide a method, a terminal, and a system for fiber network management. A terminal obtains configuration information from a management system and sends an identifier of a configuration port connected to a fiber to an ODN device to allow the ODN device to indicate, according to a configuration port identifier, a corresponding configuration port into which one end of a fiber is inserted. The terminal then sends, according to a received first identifier of one end of the fiber and a corresponding configuration port identifier which are sent by the ODN device, and a second identifier of the other end of the fiber, which is sent by a detecting module, an identifier of a peer configuration port connected to the fiber to the ODN device to allow the ODN device to indicate, according to the received peer configuration port identifier, a corresponding peer configuration port into which the other end of the fiber is inserted, thereby implementing intelligent fiber management. This method can reduce an error rate of fiber connection and be convenient to management.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention, and persons of ordinary skill in the art may still derive other drawings from the accompanying drawings without creative efforts.

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
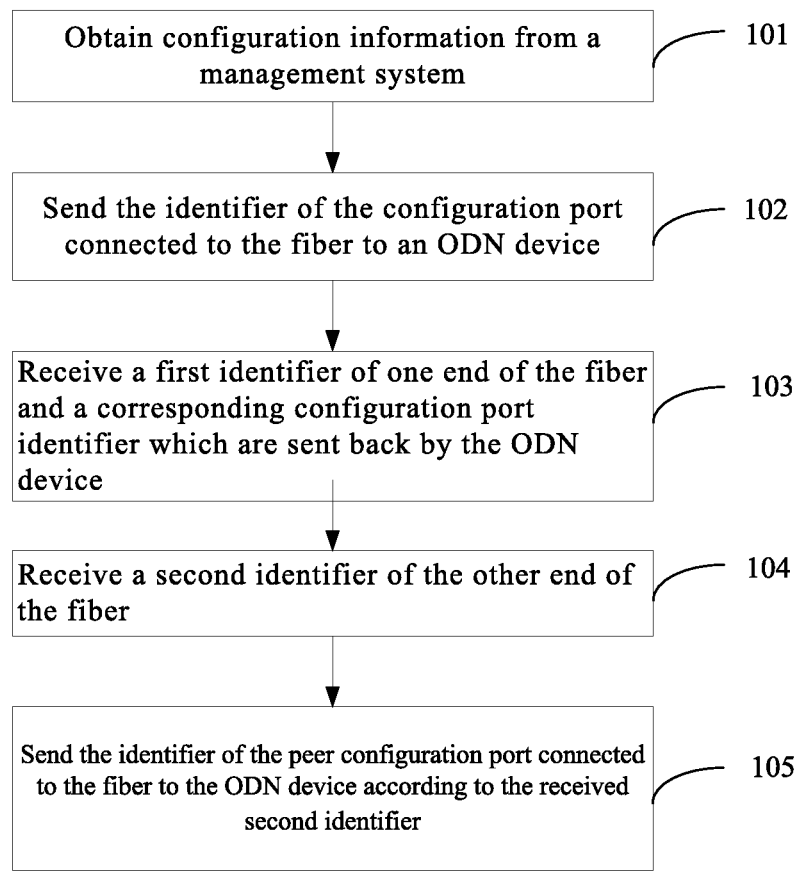
FIG. 1 is a flowchart of a fiber network management method provided in Embodiment 1.

An embodiment of the present invention provides a fiber network management method. As shown in FIG. 1, the method includes the following steps.

Step 101: Obtain configuration information from a management system.

When a fiber connection operation is required, the management system delivers configuration information to a terminal. Of course, the configuration information may be sent by the management system at a fixed time. The configuration information records an identifier of a configuration port connected to a fiber and an identifier of a peer configuration port connected to the fiber, where the configuration port identifier and the peer configuration port identifier are one-to-one mapping.

Step 102: Send the identifier of the configuration port connected to the fiber to an ODN device.

After obtaining the configuration information from the management system, the terminal sends the identifier of the configuration port connected to the fiber to the ODN device. The ODN device indicates, according to the received configuration port identifier, a corresponding configuration port into which one end of the fiber needs to be inserted. The ODN device may indicate, by lighting up an indicator light of the corresponding configuration port, the corresponding configuration port into which one end of the fiber needs to be inserted and may also indicate, through other indication information, the corresponding configuration port into which one end of the fiber needs to be inserted, and no limitation is made herein. An operator who performs a fiber connection may insert one end of the fiber into the corresponding configuration port according to an indication of the ODN device.

Step 103: Receive a first identifier of one end of the fiber and a corresponding configuration port identifier which are sent by the ODN device.

After one end of the fiber is inserted into the corresponding configuration port, the ODN device is capable of detecting the first identifier of one end of the fiber and the corresponding configuration port identifier. Then, the ODN device sends the first identifier of one end of the fiber and the corresponding configuration port identifier to the terminal. The terminal receives the first identifier of one end of the fiber and the corresponding configuration port identifier, which are sent by the ODN device.

Step 104: Receive a second identifier of the other end of the fiber.

After one end of the fiber is inserted into the corresponding configuration port, an operator inserts the other end of the fiber into a detecting socket of a detecting module. The detecting module can detect the second identifier of the other end of the fiber. The detecting module then sends the second identifier to the terminal. A first identifier and a second identifier of a same fiber are one-to-one mapping. Specifically, a first identifier and a second identifier of each fiber have a local code+a peer code. For example, if a first identifier of a fiber is 1122, in which 11 is a local code and 22 is a peer code, then a second identifier of the fiber is 2211, in which 22 is a local code and 11 is a peer code. Of course, the first identifier and the second identifier of each fiber may be in a one-to-one mapping relationship in other manners, and no limitation is made herein.

Step 105: Send the identifier of the peer configuration port connected to the fiber to the ODN device according to the received second identifier, the first identifier of one end of the fiber, and the configuration information.

After receiving the second identifier, the terminal can know, according to the second identifier, the first identifier of one end of the fiber, and the configuration information, the peer configuration port identifier corresponding to the other end. The terminal sends the peer configuration port identifier to the ODN device. The ODN device then indicates, according to the received peer configuration port identifier, the corresponding peer configuration port into which the other end of the fiber needs to be inserted. The ODN device may indicate, by lighting up an indicator light of the corresponding peer configuration port, the corresponding peer configuration port into which the other end of the fiber needs to be inserted and may also indicate, through other indication information, the corresponding peer configuration port into which the other end of the fiber needs to be inserted, and no limitation is made herein. An operator who performs a fiber connection may insert the other end of the fiber to the corresponding peer configuration port according to the ODN device's indication. By now, two ends of the fiber are inserted into corresponding ports respectively, and a fiber access connection is completed.

An embodiment of the present invention provides a fiber network management method. A terminal obtains configuration information from a management system and sends an identifier of a configuration port connected to a fiber to an ODN device to allow the ODN device to indicate, according to the configuration port identifier, a corresponding configuration port into which one end of a fiber is inserted. The terminal then sends, according to a received first identifier of one end of the fiber and a corresponding configuration port identifier, which are sent by the ODN device, and the second identifier of the other end of the fiber, which is sent by a detecting module, an identifier of a peer configuration port connected to the fiber to the ODN device to allow the ODN device to indicate, according to the received peer configuration port identifier, a corresponding peer configuration port into which the other end of the fiber is inserted, thereby implementing intelligent fiber management. This method can reduce an error rate and be convenient to management.

Embodiment 2

Figure 2:
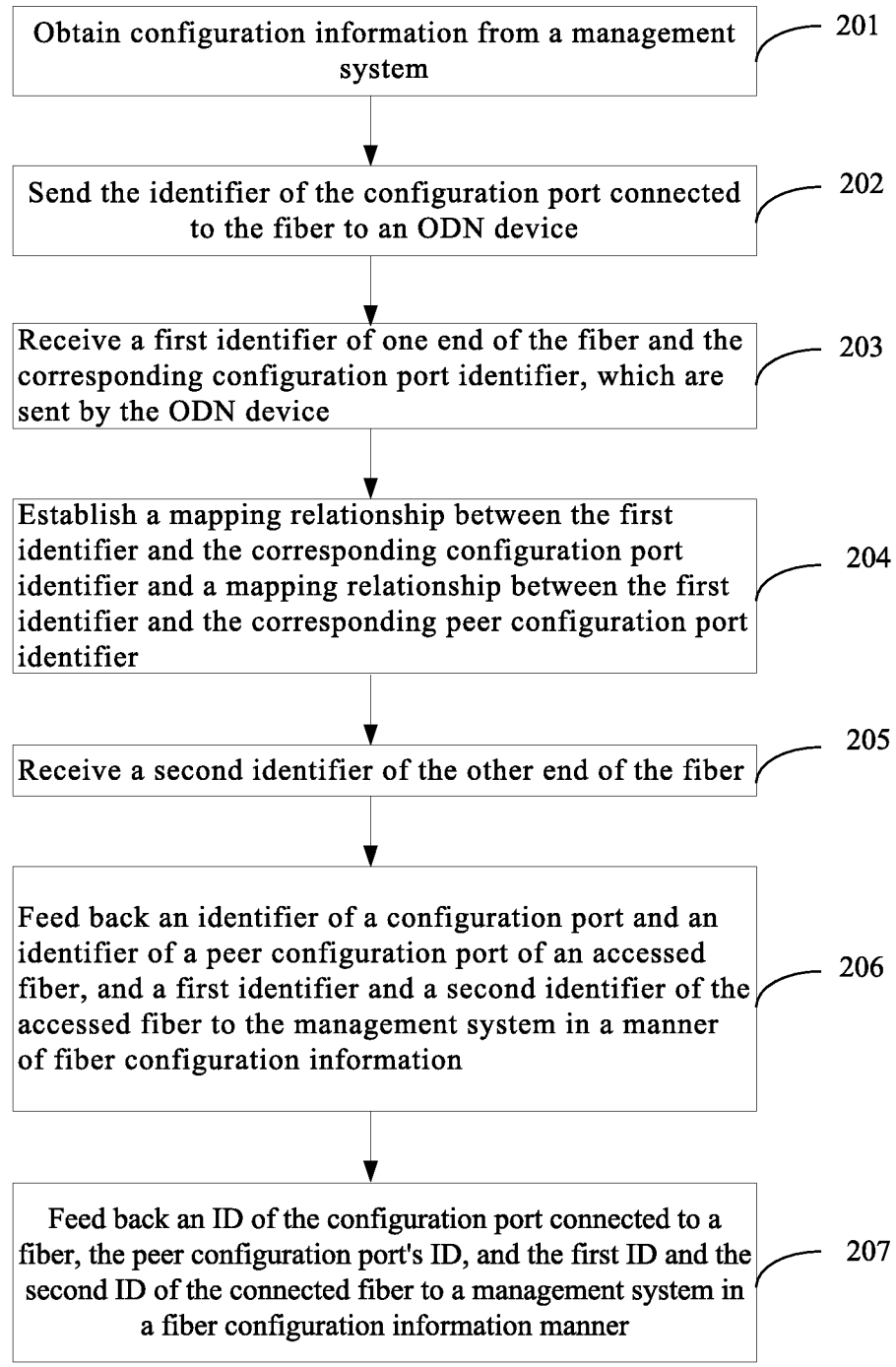
FIG. 2 is a flowchart of a fiber network management method provided in Embodiment 2.

An embodiment of the present invention provides a fiber network management method. As shown in FIG. 2, the method includes the following steps.

Step 201: Obtain configuration information from a management system.

When a fiber connection operation is required, the management system delivers configuration information to a terminal. Of course, the configuration information may also be sent by the management system at a fixed time. The configuration information records an identifier of a configuration port connected to a fiber and an identifier of a peer configuration port connected to the fiber, where the configuration port identifier and the peer configuration port identifier are one-to-one mapping.

Step 202: Send the identifier of the configuration port connected to the fiber to an ODN device.

After obtaining the configuration from the management system, the terminal sends the identifier of the configuration port connected to the fiber to the ODN device. The ODN device indicates, according to the received configuration port identifier, a corresponding configuration port into which one end of the fiber needs to be inserted. The ODN device may indicate, by lighting up an indicator light of the corresponding configuration port, the corresponding configuration port into which one end of the fiber needs to be inserted and may also indicate, through other indication information, the corresponding configuration port into which one end of the fiber needs to be inserted, and no limitation is made herein. An operator who performs a fiber connection may insert, according to the ODN device's indication, one end of the fiber into the corresponding configuration port.

Step 203: Receive a first identifier of one end of the fiber and the corresponding configuration port identifier, which are sent by the ODN device.

After one end of the fiber is inserted into the corresponding configuration port, the ODN device detects the first identifier of one end of the fiber and the corresponding configuration port identifier. Then, the ODN device sends the first identifier of one end of the fiber and the corresponding configuration port identifier to the terminal. The terminal receives the first identifier of one end of the fiber and the corresponding configuration port identifier, which are sent by the ODN device.

Step 204: Establish a mapping relationship between the first identifier and the corresponding configuration port identifier and a mapping relationship between the first identifier and the corresponding peer configuration port identifier.

After receiving the first identifier of one end of the fiber and the corresponding configuration port identifier, which are sent back by the ODN device, the terminal establishes the mapping relationship between the first identifier and the corresponding configuration port identifier and the mapping relationship between the first identifier and the corresponding peer configuration port identifier, that is, each first identifier corresponds to only one configuration port identifier and only one peer configuration port identifier.

Step 205: Receive a second identifier of the other end of the fiber.

After one end of the fiber is inserted into the corresponding configuration port, an operator inserts the other end of the fiber into a detecting socket of a detecting module. The detecting module can detect the second identifier of the other end of the fiber. The detecting module then sends the second identifier to the terminal. A first identifier and a second identifier of a same fiber are one-to-one mapping. Specifically, a first identifier and a second identifier of each fiber have a local code+a peer code. For example, if a first identifier of a fiber is 1122, in which 11 is a local code and 22 is a peer code, then a second identifier of the fiber is 2211, in which 22 is a local code and 11 is a peer code. Of course, the first identifier and the second identifier of the same fiber may be one-to-one mapping in other manners, and no limitation is made herein.

Step 206: Send, according to the received second identifier, the mapping relationship between the first identifier and the corresponding configuration port identifier, and the mapping relationship between the first identifier and the corresponding peer configuration port identifier, the identifier of the peer configuration port connected to the fiber to the ODN device.

After receiving the second identifier, the terminal obtains, according to the second identifier, a first identifier that is in a one-to-one mapping relationship with the second identifier and of the same fiber and knows, according to the mapping relationship between the first identifier and the corresponding configuration port identifier and the mapping relationship between the first identifier and the corresponding peer configuration port identifier, an identifier of a peer configuration port corresponding to the other end of the fiber. Then, the terminal sends the peer configuration port identifier to the ODN device. The ODN device indicates, according to the received peer configuration port identifier, the corresponding peer configuration port into which the other end of the fiber needs to be inserted. The ODN device may indicate, by lighting up an indicator light of the corresponding peer configuration port, the corresponding peer configuration port into which the other end of the fiber needs to be inserted and may also indicate, through other indication information, the corresponding peer configuration port into which the other end of the fiber needs to be inserted, and no limitation is made herein. An operator who performs a fiber connection may insert, according to the ODN device's indication, the other end of the fiber into the corresponding peer configuration port. By now, two ends of the fiber are inserted into the corresponding ports respectively, and the fiber connection is completed.

Step 207: Feed back an identifier of a configuration port and an identifier of a peer configuration port of an accessed fiber, and a first identifier and a second identifier of the accessed fiber to the management system in a manner of fiber configuration information.

After the terminal sends, according to the received second identifier, the mapping relationship between the first identifier and the corresponding configuration port identifier, and the mapping relationship between the first identifier and the corresponding peer configuration port identifier, the identifier of the configuration port connected to the fiber to the ODN device, and the terminal also feeds back a one-to-one mapping between an identifier of a configuration port and an identifier of a peer configuration port connected to the fiber, the first identifier and the second identifier of the accessed fiber to the management system in a manner of fiber configuration information. The one-to-one mapping between the identifier of the configuration port and the identifier of the peer configuration port connected to the fiber, the first identifier and the second identifier of the accessed fiber is: The first identifier of the accessed fiber corresponds to the identifier of the configuration port connected to one end of the fiber. The second identifier corresponds to the identifier of the peer configuration port connected to the other end of the fiber. The first identifier and the second identifier are one-to-one mapping, and the configuration port identifier and the peer configuration port identifier are also one-to-one mapping.

Figure 3:
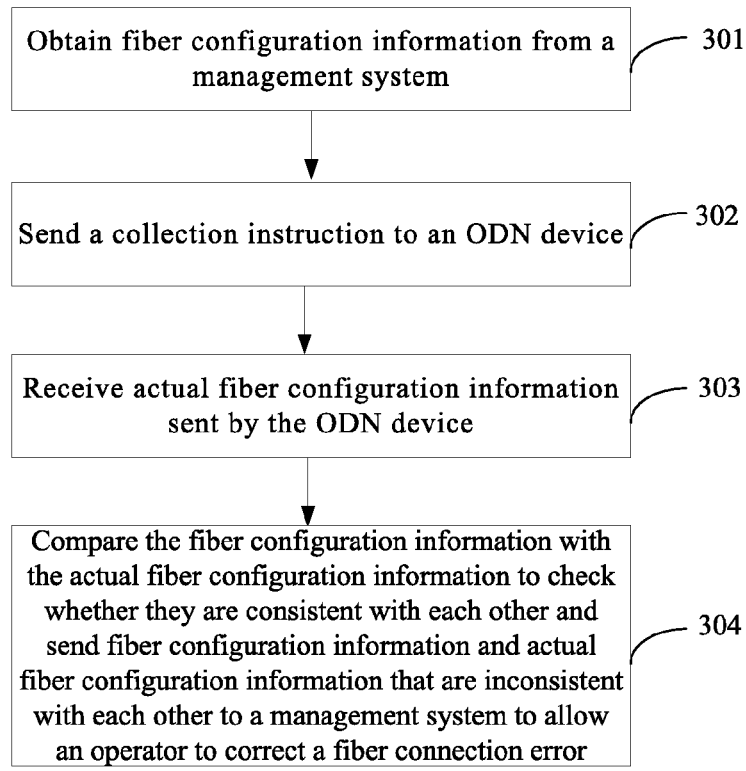
FIG. 3 is a flowchart of an automatic line patrol method provided in Embodiment 2.

Based on performing a fiber connection by using the foregoing management method, automatic line patrol may also be implemented to detect whether a fiber connection is correct. As shown in FIG. 3, a process of automatic line patrol includes the following steps.

Step 301: Obtain fiber configuration information from a management system.

When a terminal receives fiber configuration information delivered by the management system, an automatic line patrol functional service needs to be started. The fiber configuration information is the fiber configuration information that a terminal feeds back to the management system in step 207.

Step 302: Send a collection instruction to an ODN device.

The terminal sends the collection instruction to the ODN device to instruct the ODN device to collect and send back actual fiber configuration information.

Step 303: Receive actual fiber configuration information sent by the ODN device.

The actual fiber configuration information includes an identifier of a configuration port and an identifier of a peer configuration port of an actually connected fiber, and a first identifier and a second identifier of the actually connected fiber. The identifier of the configuration port and the identifier of the peer configuration port of the actually connected fiber and the first identifier and the second identifier of the actually connected fiber are one-to-one mapping.

Step 304: Compare the fiber configuration information with the actual fiber configuration information to check whether they are consistent with each other and send fiber configuration information and actual fiber configuration information that are inconsistent with each other to the management system to allow an operator to correct a fiber connection error.

The terminal compares the fiber configuration information with the actual fiber configuration information to check whether they are consistent. If the one-to-one mapping relationship between the fiber configuration information and the actual fiber configuration information is consistent, that is, the first identifier, the second identifier, the configuration port, and the peer configuration port in the fiber configuration information are all consistent with the actual first identifier, the actual second identifier, the actual configuration port, and the actual peer configuration port in the actual fiber configuration information, it indicates that the fiber is connected correctly. If at least one of the four information items is inconsistent, it indicates that the fiber is connected incorrectly. The terminal sends fiber configuration information and actual fiber configuration information that are inconsistent with each other to the management system to allow the management system to know an error point of a fiber connection and further instruct the operator to correct the error in the fiber connection.

Figure 4:
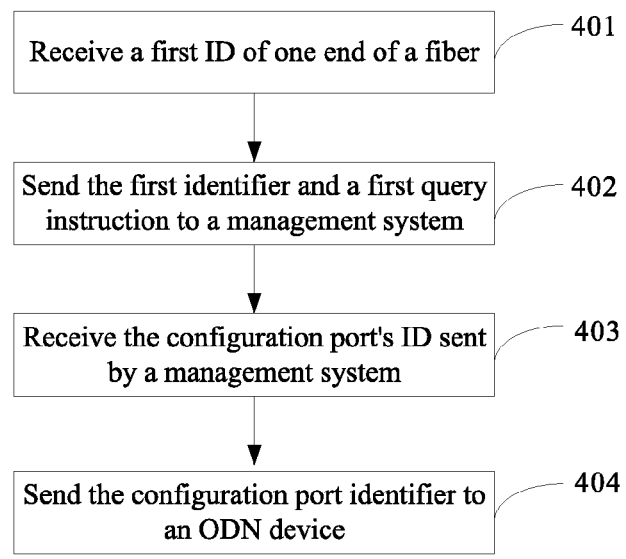
FIG. 4 is a flowchart of a fiber connection maintenance method provided in Embodiment 2.

Based on performing a fiber connection by using the foregoing management method, fiber connection maintenance may also be performed when a fiber is disconnected. As shown in FIG. 4, the process for the fiber connection maintenance method includes the following steps.

Step 401: Receive a first identifier of one end of a fiber.

A terminal receives the first identifier of one end of the fiber, where the first identifier of one end of the fiber is sent back after a fiber detecting module detects one end of the fiber.

If the fiber is connected for a long time, one end of the fiber may be disconnected due to various reasons. An operator inserts the disconnected end of the fiber into the detecting module. The detecting module can detect the first identifier of one end of the fiber, and then sends the first identifier to the terminal. The terminal receives the first identifier.

Step 402: Send the first identifier and a first query instruction to a management system, where the first identifier of one end of the fiber and the first query instruction are sent to the management system to allow the management system to query, according to the fiber configuration information and for the first identifier of one end of the fiber, a corresponding configuration port identifier.

In step 207, the management system already receives and stores the fiber configuration information. The fiber configuration information includes an identifier of a configuration port and an identifier of a peer configuration port of an accessed fiber, and a first identifier and a second identifier of the accessed fiber. The four identifiers are in a one-to-one mapping relationship with each other, which is not described herein again. The terminal sends the first identifier and the first query instruction to the management system. The management system queries, according to the received first identifier and the first query instruction, the fiber configuration information and queries the configuration port identifier corresponding to the first identifier of one disconnected end of the fiber. The management system sends, according to the first query instruction, the corresponding configuration port identifier obtained through querying to the terminal.

Step 403: Receive the configuration port identifier sent by the management system.

Step 404: Send the configuration port identifier to an ODN device.

The terminal sends the configuration port identifier to the ODN device to allow the ODN device to indicate, according to the received configuration port identifier, a corresponding configuration port into which one end of a fiber is inserted.

The terminal sends the configuration port identifier to the ODN device. The ODN device indicates, according to the received peer configuration port identifier, the corresponding configuration port into which the other port of the fiber needs to be inserted. The ODN device may indicate, by lighting up an indicator light of the corresponding configuration port, the corresponding configuration port into which one disconnected end of the fiber needs to be inserted and may also indicate, through other indication information, the corresponding configuration port into which one disconnected end of the fiber needs to be inserted, and no limitation is made herein. An operator who performs a fiber connection may insert, according to the ODN device's indication, one end of the fiber into the corresponding configuration port. By now, the disconnected end of the fiber is inserted into the corresponding port, and fiber connection maintenance is completed.

Figure 5:
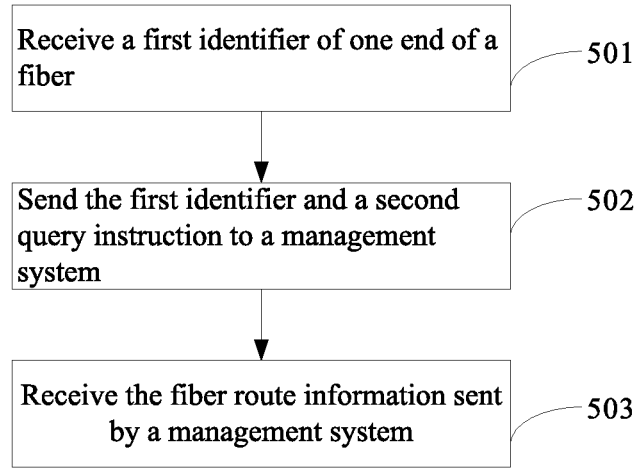
FIG. 5 is a flowchart of a method for obtaining fiber route information provided in Embodiment 2.

When a user's fiber connection is faulty, the fault is reported to the management system. After receiving the failure report, the management system delivers a notification to a terminal. When an operator troubleshoots the fault after receiving the notification, sometimes the operator needs to obtain fiber route connection information. Based on the foregoing method, as shown in FIG. 5, the method for obtaining fiber route information includes the following steps.

Step 501: Receive a first identifier of one end of a fiber.

An operator removes a faulty end of the fiber connected to a user port and inserts the end of the fiber into a detecting module. The detecting module can detect the first identifier of one end of the fiber, and then sends the first identifier to the terminal. The terminal receives the first identifier.

Step 502: Send the first identifier and a second query instruction to a management system, where the first identifier of one end of the fiber and the second query instruction are sent to the management system to allow the management system to query, according to the fiber configuration information and for the first identifier of one end of the fiber, corresponding fiber route information. The fiber route information is information about a fiber connection from a network to a user.

The management system already receives the fiber configuration information. The fiber configuration information includes an identifier of a configuration port and an identifier of a peer configuration port of an accessed fiber, a first identifier and a second identifier of the accessed fiber. The four identifiers are in a one-to-one mapping relationship with each other, which is not described herein again. After receiving the fiber configuration information, the management system accordingly stores the fiber configuration information and fiber route information corresponding to the fiber connection port.

The terminal sends the first identifier and the second query instruction to the management system. The management system queries, according to the received first identifier and the received second query instruction, the corresponding fiber route information. The management system sends, according to the first query instruction, the corresponding configuration port identifier obtained through querying to the terminal.

Step 503: Receive the fiber route information sent by the management system.

The terminal receives the fiber route information sent by the management system. An operator may know, through the terminal, information about a fiber link from a faulty user-side port to an OLT (optical line terminal, optical line terminal) device-side port, thereby making it convenient for an operator to troubleshoot a fault.

In the method in the embodiment of the present invention, a power supply module provides power for an ODN device and a detecting module to allow the ODN device and the detecting module to run normally. Communication between a terminal, the ODN device, and the detecting module is implemented when the terminal itself establishes communication channels with the ODN device, and the detecting module. Of course, it may also be implemented when a communication relay is used to establish communication channels between the terminal, the ODN device, and the detecting module. Specifically, communication manners used by the communication may be wired or wireless communication manners, including, but not limited to, communication manners such as a mobile communication manner (2G, 3G, and 4G standards and the like), Wi-Fi, WiMax, copper wire, fiber, and USB.

An embodiment of the present invention provides a fiber network management method. A terminal obtains configuration information from a management system and sends an identifier of a configuration port connected to a fiber to an ODN device to allow the ODN device to indicate, according to the configuration port identifier, a corresponding configuration port into which one end of a fiber is inserted. The terminal then sends, according to a received first identifier of one end of the fiber and a corresponding configuration port identifier, which are sent by the ODN device, and a second identifier of the other end of the fiber, which is sent by a detecting module, an identifier of a peer configuration port connected to the fiber to the ODN device to allow the ODN device to indicate, according to the received peer configuration port identifier, a corresponding peer configuration port the other end of the fiber is inserted, thereby implementing a fiber connection. This method can reduce an error rate and be convenient to management.

In addition, in this method, the terminal obtains the fiber configuration information from the management system and receives actual fiber configuration information sent by the ODN device, compares the fiber configuration information with the actual fiber configuration information to check whether they are consistent with each other, and sends fiber configuration information and actual fiber configuration information that are inconsistent with each other to the management system to allow an operator to correct a fiber connection error, thereby automatically completing line patrol detection and being convenient to management.

In addition, the method for fiber connection maintenance and the method for obtaining fiber route information provided in the embodiment of the present invention need no manual query through intelligent terminal management, thereby reducing the error rate and be convenient to the management.

Embodiment 3

Figure 6:
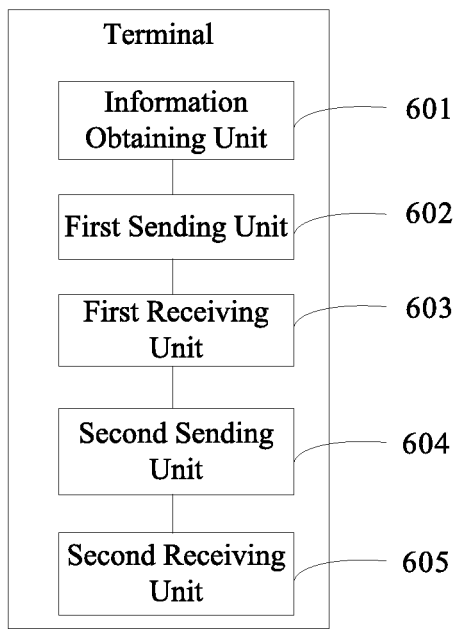
FIG. 6 is a structural block diagram of a terminal provided in Embodiment 3.

An embodiment of the present invention further provides a terminal. As shown in FIG. 6, the terminal includes an information obtaining unit 601, a first sending unit 602, a first receiving unit 603, a second receiving unit 604, and a second sending unit 605.

The information obtaining unit 601 is configured to obtain configuration information from a management system, where the configuration information records an identifier of a configuration port connected to a fiber and an identifier of a peer configuration port connected to the fiber.

When a fiber connection operation is required, a management system delivers the configuration information to the terminal. Of course, the configuration information may also be sent by the management system at a fixed time. The configuration information records the identifier of the configuration port connected to the fiber and the identifier of the peer configuration port connected to the fiber, where the configuration port identifier and the peer configuration port identifier are one-to-one mapping.

The first sending unit 602 is configured to send the identifier of the configuration port connected to the fiber to an ODN device to allow the ODN device to indicate, according to the received configuration port identifier, a corresponding configuration port into which one end of the fiber is inserted.

After obtaining configuration from the management system, the terminal sends the identifier of the configuration port to the ODN device. The ODN device indicates, according to the received configuration port identifier, the corresponding configuration port into which one end of the fiber needs to be inserted. The ODN device may indicate, by lighting up an indicator light of the corresponding configuration port, the corresponding configuration port into which one end of the fiber is inserted and may also indicate, through other indication information, the corresponding configuration port into which one end of the fiber needs to be inserted, and no limitation is made herein. An operator who performs a fiber connection may insert, according to the ODN device's indication, one end of the fiber into the corresponding configuration port.

The first receiving unit 603 is configured to receive a first identifier of one end of the fiber and the corresponding configuration port identifier, which are sent by the ODN device, where the first identifier of one end of the fiber and the corresponding configuration port identifier are detected and sent by the ODN device after one end of the fiber is inserted into the corresponding configuration port.

After one end of the fiber is inserted into the corresponding configuration port, the ODN device is capable of detecting the first identifier of one end of the fiber and the corresponding configuration port identifier. Then, the ODN device sends the first identifier of one end of the fiber and the corresponding configuration port identifier to the terminal. The terminal receives the first identifier of one end of the fiber and the corresponding configuration port identifier, which are sent by the ODN device.

The second receiving unit 604 is configured to receive a second identifier of the other end of the fiber, where the second identifier of the other end of the fiber is sent back after a fiber detecting module detects the other end of the fiber. A first identifier and a second identifier of each fiber are one-to-one mapping.

After one end of the fiber is inserted into the corresponding configuration port, an operator inserts the other end of the fiber into a detecting socket of a detecting module. The detecting module can detect the second identifier of the other end of the fiber. The detecting module then sends the second identifier to the terminal. A first identifier and a second identifier of a same fiber are one-to-one mapping. Specifically, a first identifier and a second identifier of each fiber have a local code+a peer code. For example, if a first identifier of a fiber is 1122, in which 11 is a local code and 22 is a peer code, then a second identifier of the fiber is 2211, in which 22 is a local code and 11 is a peer code. Of course, the first identifier and the second identifier of the same fiber may be one-to-one mapping in other manners, and no limitation is made herein.

The second sending unit 605 is configured to send, according to the received second identifier of the other end of the fiber, the first identifier of one end of the fiber, and the configuration information, the identifier of the peer configuration port connected to the fiber to the ODN device to allow the ODN device to indicate, according to the received identifier of the peer configuration port, a corresponding peer configuration port into which the other end of the fiber is inserted.

After receiving the second identifier, the terminal obtains, according to the second identifier, a first identifier that is in a one-to-one mapping relationship with the second identifier and of the same fiber and knows, according to the mapping relationship between the first identifier and the corresponding configuration port identifier and the mapping relationship between the first identifier and the corresponding peer configuration port identifier, an identifier of a peer configuration port corresponding to the other end of the fiber. Then, the terminal sends the peer configuration port identifier to the ODN device. The ODN device indicates, according to the received peer configuration port identifier, the corresponding peer configuration port into which the other end of the fiber needs to be inserted.

The ODN device may indicate, by lighting up an indicator light of the corresponding peer configuration port, the corresponding peer configuration port into which the other end of the fiber needs to be inserted and may also indicate, through other indication information, the corresponding peer configuration port into which the other end of the fiber needs to be inserted, and no limitation is made herein. An operator who performs a fiber connection may insert, according to the ODN device's indication, the other end of the fiber to the corresponding peer configuration port. By now, two ends of a fiber are inserted into the corresponding ports respectively, and the fiber connection is completed.

The terminal shown in FIG. 6 is configured to implement the method shown in FIG. 1 in Embodiment 1.

Figure 7:
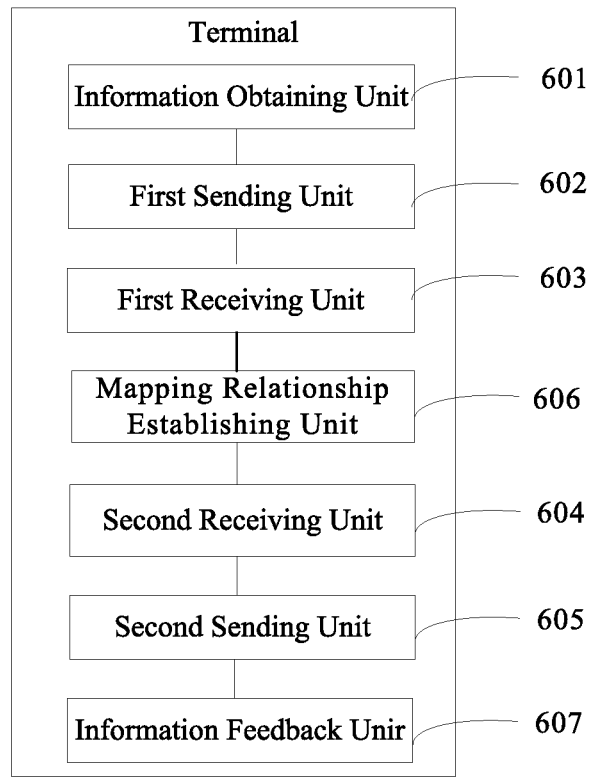
FIG. 7 is a structural block diagram of another terminal provided in Embodiment 3.

Furthermore, as shown in FIG. 7, the terminal further includes a mapping relationship establishing unit 606 and an information feedback unit 607.

The mapping relationship establishing unit 606 is configured to: after the first receiving unit 603 receives the first identifier of one end of the fiber and the corresponding configuration port identifier, which are sent back by the ODN device, establish a mapping relationship between the first identifier and the corresponding configuration port identifier and a mapping relationship between the first identifier and the peer configuration port identifier to send, after receiving the second identifier and according to the mapping relationship and a mapping between the first identifier and the second identifier, an identifier of a peer configuration port connected to the fiber to the ODN device.

After receiving the first identifier of one end of the fiber and the corresponding configuration port identifier, which are sent back by the ODN device, the terminal establishes a mapping relationship between the first identifier and the corresponding configuration port identifier and a mapping relationship between the first identifier and the corresponding peer configuration port identifier, that is, each first identifier corresponds to only one configuration port identifier and only one peer configuration port identifier.

The information feedback unit 607 is configured to feed back an identifier of a configuration port and an identifier of a peer configuration port of an accessed fiber, and a first identifier and a second identifier of the accessed fiber to the management system in a manner of configuration information.

After the terminal sends, according to the received second identifier, the mapping relationship between the first identifier and the corresponding configuration port identifier, and the mapping relationship between the first identifier and the corresponding peer configuration port identifier, the identifier of the peer configuration port connected to the fiber to the ODN device, the terminal may also feed back the identifier of the configuration port connected to a fiber, and the identifier of the peer configuration port connected to the fiber, and the one-to-one mapping relationship between the first identifier and the second identifier of the accessed fiber to the management system in a manner of fiber configuration information.

The terminal shown in FIG. 7 is configured to implement the method shown in FIG. 2 in Embodiment 2.

Figure 8:
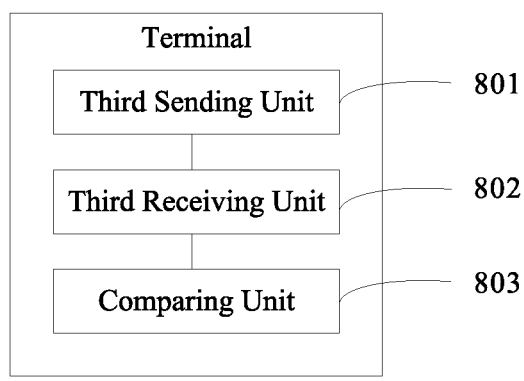
FIG. 8 is a structural block diagram of another terminal provided in Embodiment 3.

Furthermore, as shown in FIG. 8, based on the foregoing terminal, the terminal further includes a third sending unit 801, a third receiving unit 802, and a comparing unit 803.

The third sending unit 801 is configured to send a collection instruction to the ODN device to instruct the ODN device to collect and send back actual fiber configuration information.

During automatic line patrol, the terminal sends the collection instruction to the ODN device to instruct the ODN device to collect and send back the actual fiber configuration information.

The third receiving unit 802 is configured to obtain, from the management system, the fiber configuration information fed back by the information feedback unit 607 and receive the actual fiber configuration information sent by the ODN device, where the actual fiber configuration information includes an identifier of a configuration port and an identifier of a peer configuration port of an actually connected fiber, and a first identifier and a second identifier of the actually connected fiber.

The comparing unit 803 is configured to compare the fiber configuration information with the actual fiber configuration information to check whether they are consistent with each other and send fiber configuration information and actual fiber configuration information that are inconsistent with each other to the management system to allow an operator to correct a fiber connection error.

The terminal compares the fiber configuration information with the actual fiber configuration information to check whether they are consistent with each other. If the one-to-one mapping relationship between the fiber configuration information and the actual fiber configuration information is consistent, that is, the first identifier, the second identifier, the configuration port, and the peer configuration port in the fiber configuration information are all consistent with the actual first identifier, the actual second identifier, the actual configuration port, and the actual peer configuration port in the actual fiber configuration information, it indicates that the fiber is connected correctly. If at least one of the four information items is inconsistent, it indicates that the fiber is connected incorrectly. The terminal sends fiber configuration information and actual fiber configuration information that are inconsistent with each other to the management system to allow the management system to know an error point of a fiber connection and further instruct an operator to correct the error in the fiber connection.

The terminal shown in FIG. 8 is configured to implement the method shown in FIG. 3 in Embodiment 2.

Figure 9:
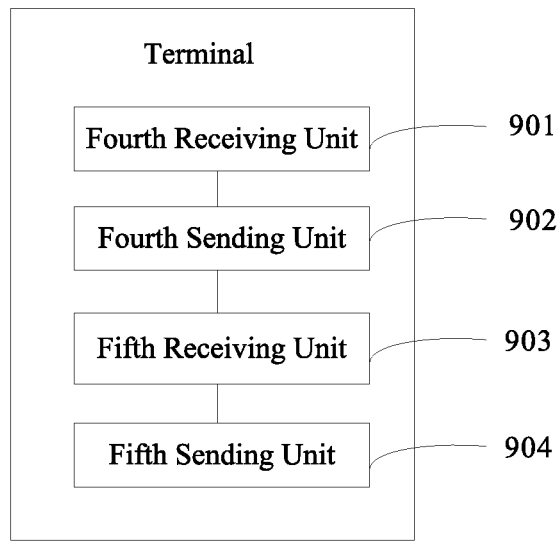
FIG. 9 is a structural block diagram of another terminal provided in Embodiment 3.

Furthermore, as shown in FIG. 9, the terminal further includes: a fourth receiving unit 901, a fourth sending unit 902, a fifth receiving unit 903, and a fifth sending unit 904.

The fourth receiving unit 901 is configured to receive the first identifier of one end of the fiber. The first identifier of one end of the fiber is sent back after the fiber detecting module detects the end of the fiber.

The fourth sending unit 902 is configured to send the first identifier of one end of the fiber and a first query instruction to the management system to allow the management system to query, according to the fiber configuration information fed back by the information feedback unit 607 and for the first identifier of one end of the fiber, a corresponding configuration port identifier.

The fifth receiving unit 903 is configured to receive the configuration port identifier sent by the management system.

The fifth sending unit 904 is configured to send the configuration port identifier to the ODN device to allow the ODN device to indicate, according to the received configuration port identifier, a corresponding configuration port into which one end of a fiber is inserted.

The terminal shown in FIG. 9 is configured to implement the method shown in FIG. 4 in Embodiment 2.

Figure 10:
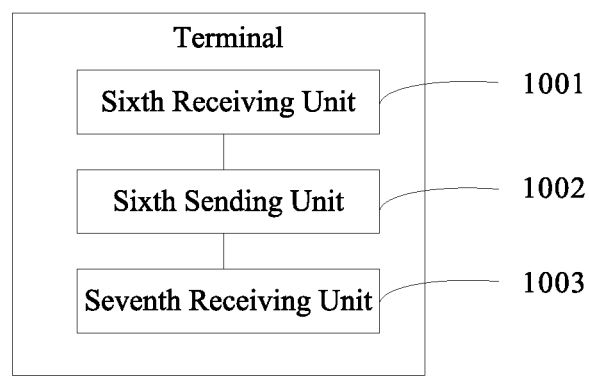
FIG. 10 is a structural block diagram of another terminal provided in Embodiment 3.

Furthermore, as shown in FIG. 10, the terminal further includes: a sixth receiving unit 1001, a sixth sending unit 1002, and a seventh receiving unit 1003.

The sixth receiving unit 1001 is configured to receive the first identifier of one end of the fiber. The first identifier of one end of the fiber is sent back after the fiber detecting module detects the end of the fiber.

The sixth sending unit 1002 is configured to send the first identifier of one end of the fiber and a second query instruction to the management system to allow the management system to query, according to the fiber configuration information fed back by the information feedback unit 607 and for the received first identifier of one end of the fiber, fiber route information of a link where the fiber resides.

The seventh receiving unit 1003 is configured to receive the fiber route information sent by the management system.

The terminal shown in FIG. 10 is configured to implement the method shown in FIG. 5 in Embodiment 2.

The terminal in the embodiment of the present invention includes, but is not limited to, a smartphone, a handheld computer, a tablet personal computer, a laptop personal computer, and a self-defined terminal.

An embodiment of the present invention provides a terminal. The terminal obtains configuration information from a management system and sends an identifier of a configuration port connected to a fiber to an ODN device to allow the ODN device to indicate, according to the configuration port identifier, a corresponding configuration port into which one end of the fiber is inserted. The terminal then sends, according to a received first identifier of one end of the fiber and a corresponding configuration port identifier, which are sent by the ODN device, and a second identifier of the other end of the fiber, which is sent by a detecting module, an identifier of a peer configuration port connected to the fiber to the ODN device to allow the ODN device to indicate, according to the received peer configuration port identifier, a corresponding peer configuration port into which the other end of the fiber is inserted, thereby implementing a fiber connection. This method can reduce an error rate and be convenient to management.

In addition, this terminal may also obtain the fiber configuration information from a management system and receive actual fiber configuration information sent by an ODN device, compare the fiber configuration information with the actual fiber configuration information to check whether they are consistent with each other, and send fiber configuration information and actual fiber configuration information that are inconsistent with each other to a management system to allow an operator to correct a fiber connection error, thereby automatically completing line patrol detection and being convenient to management.

In addition, the terminal may also perform fiber connection maintenance and fiber route information query and does not need manual query, thereby reducing the error and be convenient to the management.

Embodiment 4

Figure 11:
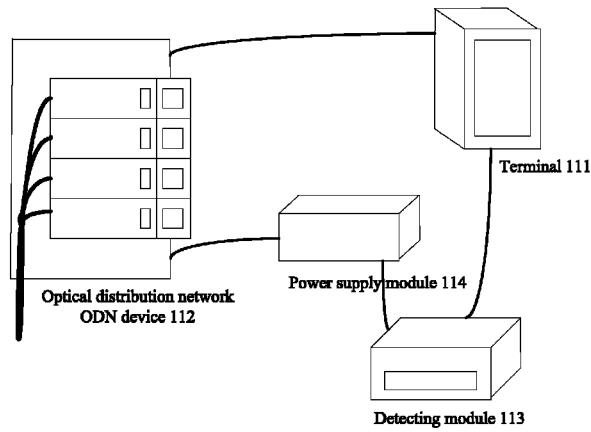
FIG. 11 is a schematic diagram of a fiber network management system provided in Embodiment 4.

An embodiment of the present invention provides a fiber network management system. As shown in FIG. 11, the fiber network management system includes an ODN device 112 and a detecting module 113.

The ODN device 112 is configured to obtain a configuration port identifier and indicate, according to the configuration port identifier, a corresponding configuration port into which one end of a fiber is inserted and detect, after one end of the fiber is inserted into the corresponding configuration port, a first identifier of one end of the fiber and a corresponding configuration port identifier; where the configuration port identifier is obtained from configuration information delivered by the management system.

The detecting module is configured to detect a second identifier of the other end of the fiber, where a first identifier and a second identifier of each fiber are one-to-one mapping.

The ODN device is further configured to obtain a peer configuration port identifier and indicate, according to the peer configuration port identifier, a corresponding peer configuration port into which the other end of the fiber is inserted; where the peer configuration port identifier is obtained according to the second identifier, the first identifier of one end of the fiber, and the configuration information.

Furthermore, as shown in FIG. 11, the system further includes a terminal 111 and a power supply module 114.

The terminal 111 is configured to obtain configuration information from a management system and send an identifier of a configuration port connected to the fiber to the ODN device 112.

The terminal 111 is configured to receive configuration information from the management system when a fiber connection operation is required. Of course, the configuration information may be sent by the management system at a fixed time. The configuration information records an identifier of a configuration port connected to a fiber and an identifier of a peer configuration port connected to the fiber, where the configuration port identifier and the peer configuration port identifier are one-to-one mapping. The terminal 111 sends, after obtaining the configuration information from the management system, the identifier of the configuration port connected to the fiber to the ODN device 112.

The ODN device 112 is configured to receive the configuration port identifier and indicate, according to the configuration port identifier, a corresponding configuration port into which one end of the fiber is inserted, and detect and send, after one end of the fiber is inserted into the corresponding configuration port, the first identifier of one end of the fiber and the corresponding configuration port identifier.

The ODN device 112 indicates, according to the configuration port identifier, the corresponding configuration port into which one end of the fiber needs to be inserted. The ODN device 112 may indicate, by lighting up an indicator light of the corresponding configuration port, the corresponding configuration port into which one end of the fiber needs to be inserted and may also indicate, through other indication information, the corresponding configuration port into which one end of the fiber needs to be inserted, and no limitation is made herein. An operator who performs a fiber connection may insert, according to the ODN device 112's indication, one end of the fiber into the corresponding configuration port. After one end of the fiber is inserted into the corresponding configuration port, the ODN device 112 is capable of detecting the first identifier of one end of the fiber and the corresponding configuration port identifier. Then, the ODN device 112 sends the first identifier of one end of the fiber and the corresponding configuration port identifier to the terminal 111.

The terminal 111 is further configured to receive the first identifier of one end of the fiber and the corresponding configuration port identifier, which are sent by an ODN device.

The detecting module 113 is configured to detect and send the second identifier of the other end of the fiber back to the terminal, where a first identifier and a second identifier of each fiber are one-to-one mapping.

After one end of the fiber is inserted into the corresponding configuration port, an operator inserts the other end of the fiber into a detecting socket of a detecting module. The detecting module can detect the second identifier of the other end of the fiber. The detecting module then sends the second identifier to the terminal. A first identifier and a second identifier of a same fiber are one-to-one mapping. Specifically, a first identifier and a second identifier of each fiber have a local code+a peer code. For example, if a first identifier of a fiber is 1122, in which 11 is a local code and 22 is a peer code, then a second identifier of the fiber is 2211, in which 22 is a local code and 11 is a peer code. Of course, the first identifier and the second identifier of the same fiber may be one-to-one mapping in other manners, and no limitation is made herein.

The terminal 111 is further configured to receive the second identifier of the other end of the fiber and send, according to the received second identifier, the first identifier of one end of the fiber, and the configuration information, a peer configuration port identifier to the ODN device to allow the ODN device to indicate, according to the received peer configuration port identifier, a corresponding peer configuration port into which the other end of the fiber needs to be inserted.

After receiving the second identifier, the terminal obtains, according to the second identifier, a first identifier that is in a one-to-one mapping relationship with the second identifier and of the same fiber and knows, according to the mapping relationship between the first identifier and the corresponding configuration port identifier and the mapping relationship between the first identifier and the corresponding peer configuration port identifier, an identifier of a peer configuration port corresponding to the other end of the fiber. Then, the terminal sends the peer configuration port identifier to the ODN device. The ODN device indicates, according to the received peer configuration port identifier, the corresponding peer configuration port into which the other end of the fiber needs to be inserted. The ODN device may indicate, by lighting up an indicator light of the corresponding peer configuration port, the corresponding peer configuration port into which the other end of the fiber needs to be inserted and may also indicate, through other indication information, the corresponding peer configuration port into which the other end of the fiber needs to be inserted, and no limitation is made herein. An operator who performs a fiber connection may insert, according to the ODN device's indication, the other end of the fiber into the corresponding peer configuration port.

The terminal 111 is further configured to feed back an identifier of a configuration port and an identifier of a corresponding peer configuration port of an accessed fiber, and a first identifier and a second identifier of the accessed fiber to the management system in a manner of fiber configuration information.

After the terminal sends, according to the received second identifier, the mapping relationship between the first identifier and the corresponding configuration port identifier, and the mapping relationship between the first identifier and the corresponding peer configuration port identifier, the identifier of the peer configuration port connected to the fiber to the ODN device, and may also feed back the identifier of the configuration port connected to the fiber and the identifier of the peer configuration port connected to the fiber, and the one-to-one mapping relationship between the first identifier and the second identifier of the accessed fiber to the management system in a manner of fiber configuration information.

The power supply module 114 is configured to provide power for the fiber network management system.

A power supply module integrated with a battery ensures a system's power supply capability. In addition, the battery is separately integrated and isolated from the terminal to allow the terminal to be lighter. Thereby, it is convenient for an operator to hold the terminal in hand. An anti-fall measure may also be added to the battery in the power supply module to improve the battery's anti-fall capability.

Furthermore, the terminal 111 is further configured to: after receiving the first identifier of one end of the fiber and the corresponding configuration port identifier, which are sent back by the ODN device, establish a mapping relationship between the first identifier and the corresponding configuration port identifier and a mapping relationship between the first identifier and the corresponding peer configuration port identifier, that is, each first identifier corresponds to only one the configuration port identifier and only one peer configuration port identifier, so that the identifier of the peer configuration port connected to the fiber is sent to the ODN device after the second identifier is received and according to the mapping relationship.

Furthermore, the terminal 111 is further configured to send a collection instruction to the ODN device.

The ODN device 112 is further configured to receive the collection instruction and send back, according to the collection instruction, actual fiber configuration information.

The terminal 111 is further configured to obtain the fiber configuration information from the management system and receive the actual fiber configuration information sent by the ODN device, compare the fiber configuration information with the actual fiber configuration information to check whether they are consistent with each other, and send fiber configuration information and actual fiber configuration information that are inconsistent with each other to the management system to allow an operator to correct a fiber connection error.

Furthermore, when fiber connection maintenance is performed, the detecting module 113 is further configured to detect and send the first identifier of one end of the fiber to the terminal 111.

The terminal 111 is further configured to receive the first identifier and send the first identifier of one end of the fiber and the first query instruction to the management system to allow the management system to query, according to the first identifier of one end of the fiber, the corresponding configuration port identifier.

The terminal 111 is further configured to receive the configuration port identifier sent by the management system and send the configuration port identifier to the ODN device.

The ODN device 112 is configured to indicate, according to the received configuration port identifier, a corresponding configuration port into which one end of the fiber is inserted.

Furthermore, when a user's fiber connection is faulty, a fault report is sent to the management system. The management system sends, after receiving the fault report, a notification to the terminal. An operator troubleshoots the fault when the terminal receives the notification, and sometimes needs to obtain fiber route information; in this case, the detecting module 113 is further configured to detect and send the first identifier of one end of the fiber to the terminal 111; the terminal 111 is further configured to receive the first identifier and send the first identifier of one end of the fiber and a second query instruction to the management system to allow the management system to query, according to the first identifier of one end of the fiber, the corresponding fiber route information; and the terminal 111 is further configured to receive the fiber route information sent by the management system.

Figure 12:
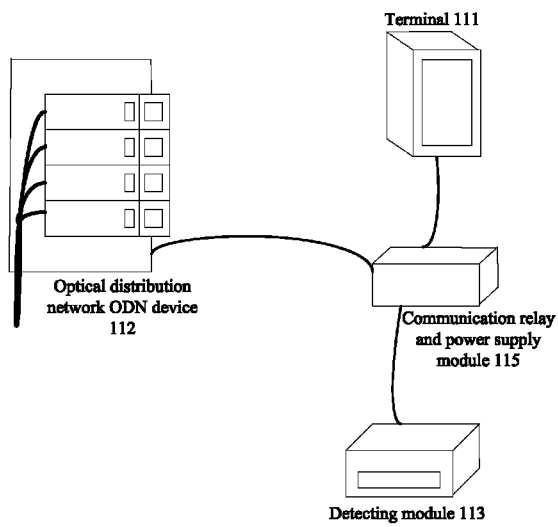
FIG. 12 is a schematic diagram of another fiber network management system provided in Embodiment 4.

Furthermore, as shown in FIG. 12, the system further includes a communication relay module, configured to transparently transmit communication information between the terminal, the ODN device, and the detecting module. The communication relay module is integrated on the power supply module to form a communication relay and power supply module 115.

Communication manners of the system provided in this embodiment may be wired or wireless communication manners, including, but not limited to, communication manners such as mobile communication manners (2G, 3G, and 4G standards and the like), Wi-Fi, WiMax, copper wire, fiber, and USB. Optionally, some terminals need a communication relay to connect communication channels among the terminal 111, the ODN device 112, and the detecting module 113, and some terminals do not need a communication relay, which is hereby determined according to specific conditions.

The detecting module 113 shown in FIG. 11 or FIG. 12 is integrated separately. Of course, optionally, the detecting module 113 may also be integrated on the communication relay and power supply module 115 or the power supply module 114 or be integrated on the ODN device 112, no limitation is made herein.

The terminal in the system provided in the embodiment of the present invention is the terminal described in Embodiment 2.

In a fiber network management system provided in the embodiment of the present invention, a terminal obtains configuration information from a management system and sends an identifier of a configuration port connected to a fiber to an ODN device to allow the ODN device to indicate, according to the configuration port identifier, a corresponding configuration port into which one end of the fiber is inserted. The terminal then sends, according to a received first identifier of one end of the fiber and a corresponding configuration port identifier, which are sent by the ODN device, and a second identifier of the other end of the fiber, which is sent by a detecting module, an identifier of a peer configuration port connected to the fiber to the ODN device to allow the ODN device to indicate, according to the received peer configuration port identifier, a corresponding peer configuration port into which the other end of the fiber is inserted, thereby implementing a fiber connection. This method can reduce an error rate and be convenient to management.

In addition, in the system, the terminal may also obtain the fiber configuration information from the management system and receive actual fiber configuration information sent by the ODN device, compare the fiber configuration information with the actual fiber configuration information to check whether they are consistent with each other, and send fiber configuration information and actual fiber configuration information that are inconsistent with each other to the management system to allow an operator to correct a fiber connection error, thereby automatically completing line patrol detection and being convenient to management.

In addition, this system may also complete fiber connection maintenance and fiber route information query and needs no manual input or manual query operation, thereby reducing the error and being convenient to the management.

Persons of ordinary skill in the art should understand that, all or part of the steps of the foregoing method embodiments may be implemented by a program instructing relevant hardware. The foregoing program may be stored in a computer readable storage medium. When the program runs, the above steps included in the method embodiments are performed. The foregoing storage medium may be any medium that can store program codes, such as a ROM, a RAM, a magnetic disk, or an optical disk.

The foregoing descriptions are merely specific implementation manners of the present invention, but are not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A fiber network management method, the method comprising:
obtaining configuration information from a management system, wherein the configuration information includes an identifier of a configuration port and an identifier of a peer configuration port;
sending the identifier of the configuration port to an optical distribution network (ODN) device;
receiving, from the ODN device, an identifier of one end of a fiber and the identifier of the configuration port wherein the identifier of the fiber and the identifier of the configuration port are detected and sent by the ODN device after the one end of the fiber is inserted into the configuration port;
receiving an identifier of an other end of the fiber, wherein the identifier of the other end of the fiber corresponds to the identifier of the one end of the fiber; and
sending the identifier of the peer configuration port to the ODN device according to the identifier of the other end of the fiber and a relationship of the identifier of the one end of the fiber, the identifier of the configuration port and the identifier of the peer configuration port.

2. The method according to claim 1, further comprising:
after receiving the identifier of the one end of the fiber and the identifier of the configuration port, establishing a mapping relationship between the identifier of the one end of the fiber and the identifier of the configuration port; and
establishing a mapping relationship between the identifier of the one end of the fiber and the identifier of the peer configuration port.

3. The method according to claim 1, further comprising:
feeding back an identifier of a configuration port and an identifier of a peer configuration port of an accessed fiber, and a first identifier and a second identifier of the accessed fiber to the management system in a manner of fiber configuration information;
receiving a first identifier of one end of the fiber, wherein the first identifier of one end of the fiber is sent back after a fiber detecting module detects one end of the fiber;
sending the first identifier of one end of the fiber and a first query instruction to the management system to allow the management system to query, according to the fiber configuration information and for the first identifier of one end of the fiber, a corresponding configuration port identifier;
receiving the identifier of the configuration port sent by the management system; and
sending the identifier of the configuration port to the ODN device to allow the ODN device to indicate, according to a received identifier of the configuration port, a corresponding configuration port into which one end of a fiber is inserted.

4. The method according to claim 1, further comprising:
feeding back an identifier of a configuration port and an identifier of a peer configuration port of an accessed fiber, and a first identifier and a second identifier of the accessed fiber to the management system in a manner of fiber configuration information;
receiving the first identifier of the one end of the fiber, wherein the first identifier of the one end of the fiber is sent back after a fiber detecting module detects the one end of the fiber;
sending the first identifier of the one end of the fiber and a second query instruction to the management system to allow the management system to query, according to the fiber configuration information and for a received first identifier of the one end of the fiber, corresponding fiber route information; wherein the fiber route information is information about a fiber connection from a network to a user; and
receiving the fiber route information sent by the management system, so that an operator troubleshoots a system connection failure according to the fiber route information.

5. A terminal comprising: a processor and a non-transitory computer readable medium communicatively connected to the processor and having instructions stored thereon that, when executed, cause the processor to:
obtain configuration information from a management system, wherein the configuration information includes an identifier of a configuration port and an identifier of a peer configuration port;
send the identifier of the configuration port to an ODN device;
receive, from the ODN device, an identifier of one end of a fiber and the identifier of the configuration port, wherein the identifier of the one end of the fiber and the identifier of the configuration port are detected and sent by the ODN device after the one end of the fiber is inserted into the configuration port;

receive an identifier of an other end of the fiber, wherein the identifier of the other end of the fiber corresponds to the identifier of the one end of the fiber; and send the identifier of the peer configuration port to the ODN device according to the identifier of the other end of the fiber and a relationship of the identifier of the one end of the fiber, the identifier of the configuration port and the identifier of the peer configuration port.

6. The terminal according to claim 5, wherein the processor is further configured to:

establish a mapping relationship between the identifier of the one end of the fiber and the identifier of the configuration port after the identifier of the one end of the fiber and the identifier of the configuration port is received; and establish a mapping relationship between the identifier of the one end of the fiber and the identifier of the peer configuration port.

7. The terminal in claim 5, wherein the processor is further configured to: feed back an identifier of a configuration port and an identifier of a peer configuration port of an accessed fiber, and a first identifier and a second identifier of the accessed fiber to the management system in a manner of fiber configuration information.

8. The terminal according to claim 7, wherein the processor is further configured to:

receive the fiber configuration information fed back by an information feedback unit and receive actual fiber configuration information sent by the ODN device, wherein the actual fiber configuration information includes an identifier of a configuration port and an identifier of a peer configuration port of an actually connected fiber, and a first identifier and a second identifier of the actually connected fiber; and compare the fiber configuration information with the actual fiber configuration information to check whether they are consistent with each other and send fiber configuration information and actual fiber configuration information that are inconsistent with each other to the management system to allow an operator to correct a fiber connection error.

9. The terminal according to claim 8, wherein the processor is further configured to: send a collection instruction to the ODN device to instruct the ODN device to collect and send back the actual fiber configuration information.

10. The terminal according to claim 7, wherein he processor is further configured to:

receive a first identifier of one end of the fiber, wherein the first identifier of one end of the fiber is sent back after a fiber detecting module detects one end of the fiber;

send the first identifier of one end of the fiber and a first query instruction to the management system to allow the management system to query, according to the fiber configuration information and for the first identifier of one end of the fiber, a corresponding configuration port identifier;

receive the identifier of the configuration port sent by the management system; and send the identifier of the configuration port to the ODN device to allow the ODN device to indicate, according to a received identifier of the configuration port, a corresponding configuration port into which one end of a fiber is inserted.

11. The terminal according to claim 7, wherein the processor is further configured to:

receive the first identifier of the one end of the fiber, wherein the first identifier of the one end of the fiber is sent back after a fiber detecting module detects the one end of the fiber;

send the first identifier of the one end of the fiber and a second query instruction to the management system to allow the management system to query, according to the fiber configuration information fed back by an information feedback unit and for a received first identifier of the one end of the fiber, fiber route information of a link where the fiber resides; and receive the fiber route information sent by the management system, so that an operator troubleshoots a system connection failure according to the fiber route information.

12. A fiber network management system comprising:

an optical distribution network (ODN) device; and a detecting device coupled to the ODN device;

wherein the ODN device is configured to obtain an identifier of a configuration port and indicate, according to the identifier of the configuration port, a corresponding configuration port into which one end of a fiber is inserted, and to detect, after one end of the fiber is inserted into the configuration port, a first identifier of one end of the fiber, wherein the detecting device is configured to detect a second identifier of an other end of the fiber, wherein the first identifier and the second identifier of each fiber are 1:1 mapping; and wherein the ODN device is further configured to obtain an identifier of a peer configuration port and indicate, according to the identifier of the peer configuration port, the corresponding peer configuration port into which the other end of the fiber is inserted.

13. The system according to claim 12, further comprising:

a terminal; and a power supply device;

wherein the terminal is configured to obtain configuration information includes the identifier of the configuration port and the identifier of the peer configuration port from a management system and to send the identifier of the configuration port to the ODN device, wherein the terminal is further configured to receive the first identifier of one end of the fiber and the identifier of the configuration port, which are sent by the ODN device, wherein the terminal is further configured to receive the second identifier of an other end of the fiber and to send the identifier of the peer configuration port to the ODN device, wherein a first identifier and a second identifier of each fiber are 1:1 mapping, and wherein the power supply device is configured to provide power for the ODN device and the detecting device.

14. The system according to claim 13, wherein the terminal is further configured to, after receiving the first identifier of one end of the fiber and the identifier of the configuration port, which are sent back by the ODN device, establish a mapping relationship between the first identifier of one end of the fiber and the identifier of the configuration port and a mapping relationship between the first identifier of one end of the fiber and the identifier of the peer configuration port, so that the identifier of the peer configuration port is sent to the ODN device after a second identifier is received and according to the mapping relationship and a mapping between the first identifier and the second identifier.

15. The system according to claim 13, wherein:

the terminal is further configured to send a collection instruction to the ODN device;

the ODN device is further configured to receive the collection instruction and collect and send back actual fiber configuration information according to the collection instruction; and the terminal is further configured to obtain the fiber configuration information from the management system and receive the actual fiber configuration information sent by the ODN device, to compare the fiber configuration information with the actual fiber configuration information to check whether they are consistent with each other, and to send fiber configuration information and actual fiber configuration information that are inconsistent with each other to the management system to allow an operator to correct a fiber connection error.

16. The system according to claim 13, wherein:

the detecting device is further configured to detect the first identifier of one end of the fiber and send the first identifier of one end of the fiber to the terminal;

the terminal is further configured to receive the first identifier and send the first identifier of one end of the fiber and a first query instruction to the management system to allow the management system to query, according to a fiber configuration information and the first identifier of one end of the fiber, a corresponding configuration port identifier;

the terminal is further configured to receive the configuration port identifier sent by the management system and send the configuration port identifier to the ODN device; and the ODN device is configured to indicate, according to the received configuration port identifier, a corresponding configuration port into which one end of the fiber is inserted.

17. The system according to claim 13, wherein:

the detecting device is further configured to detect the first identifier of one end of the fiber and send the first identifier of one end of the fiber to the terminal;

the terminal is further configured to receive the first identifier and send the first identifier of one end of the fiber and a second query instruction to the management system to allow the management system to query, according to a fiber configuration information and for first identifier of one end of the fiber, corresponding fiber route information; and the terminal is further configured to receive the fiber route information sent by the management system, so that an operator troubleshoots a system connection failure according to the fiber route information.

18. The system according to claim 13, further comprising a communication relay device, configured to transparently transmit communication information among the terminal, the ODN device, and the detecting device, wherein the communication relay device is integrated on the power supply device.

* * * * *